J. TUPPER.
ELECTRIC ANIMAL TRAP.
APPLICATION FILED SEPT. 20, 1919.
1,388,782.
Patented Aug. 23, 1921.
3 SHEETS—SHEET 2.
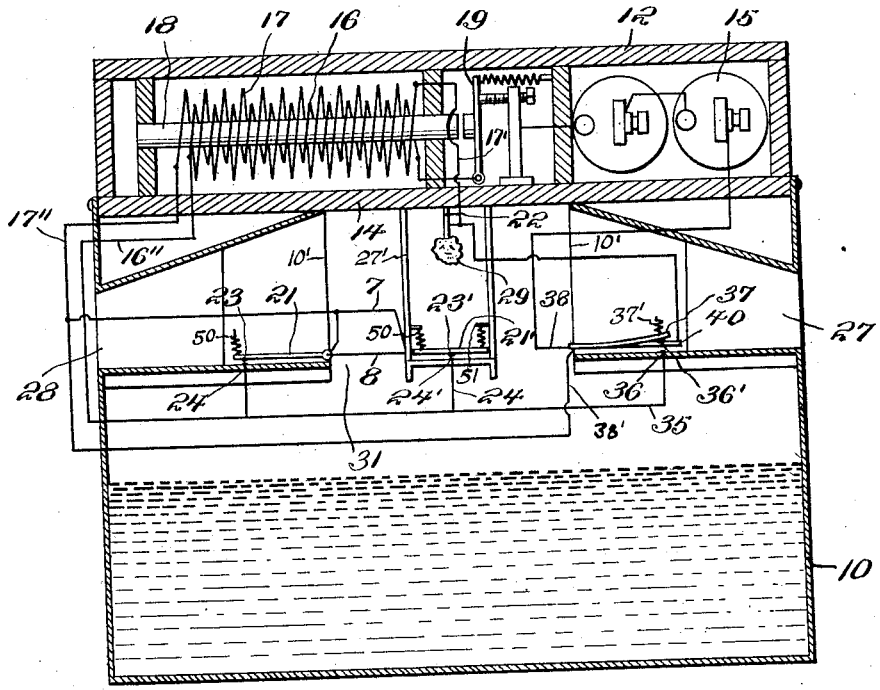
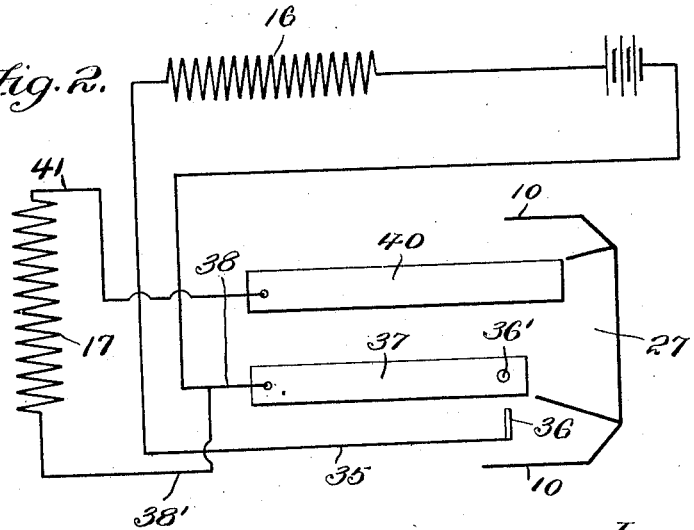
J. Tupper
INVENTOR
BY Victor J. Evans
ATTORNEY
WITNESS: G. T. L. Wright

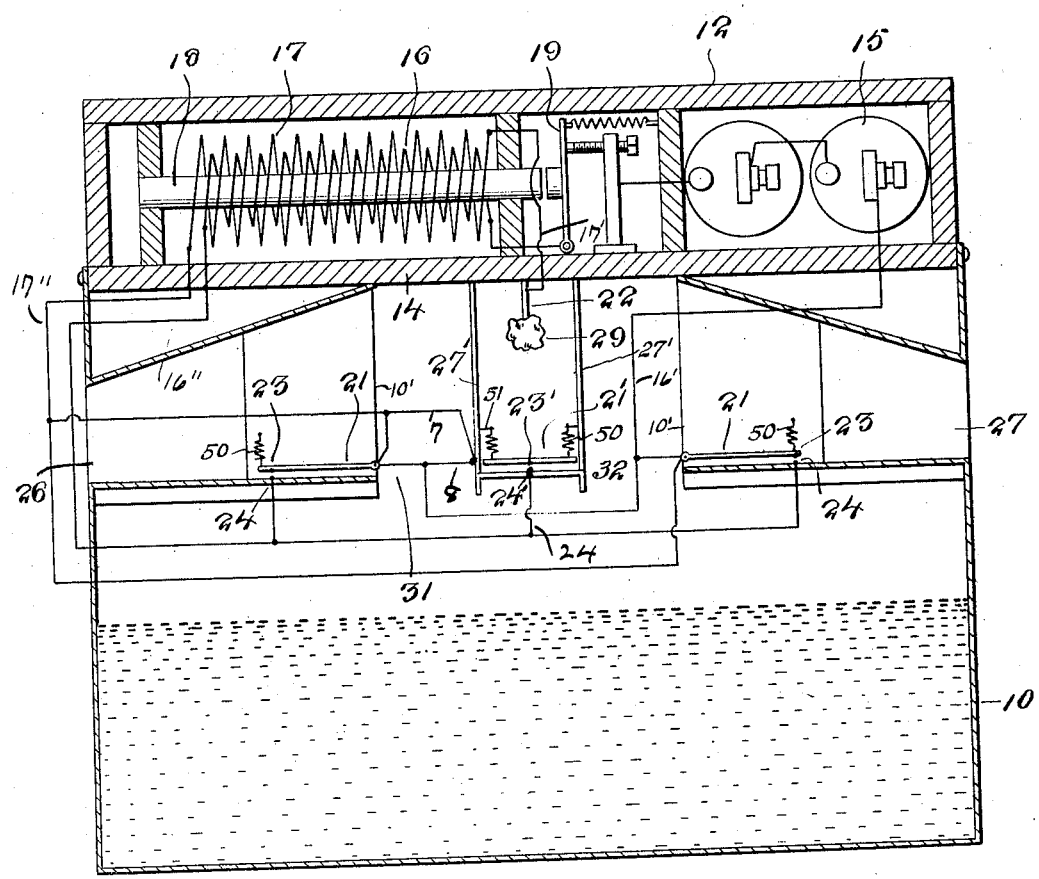

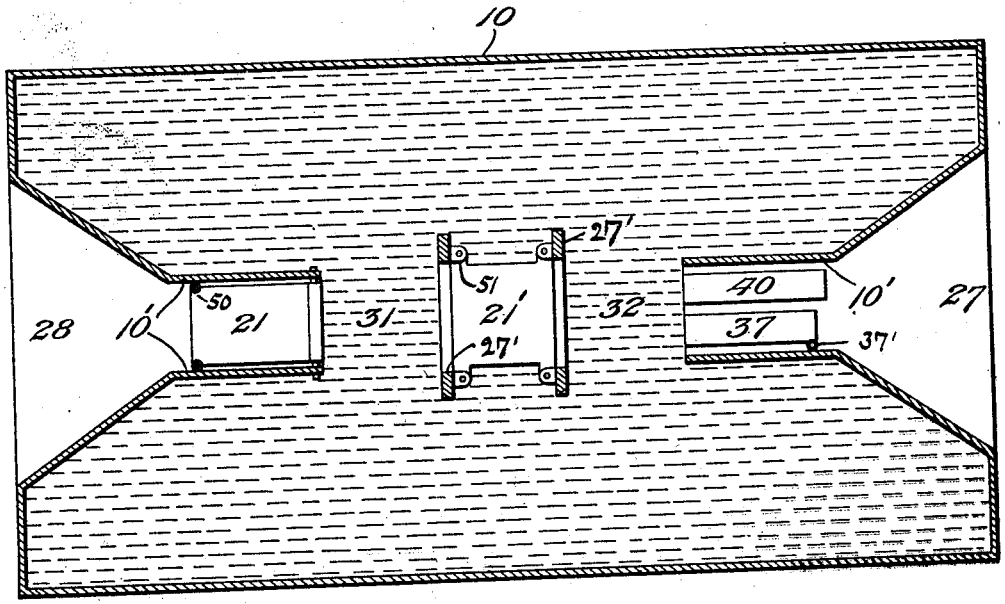

UNITED STATES PATENT OFFICE.

JOHNSON TUPPER, OF RIVER ROUGE, MICHIGAN.

ELECTRIC ANIMAL-TRAP.

1,388,782.  Specification of Letters Patent.  Patented Aug. 23, 1921.

Application filed September 20, 1919. Serial No. 325,062.

*To all whom it may concern:*

Be it known that I, JOHNSON TUPPER, citizen of the United States, residing at River Rouge, in the county of Wayne and State of Michigan, have invented new and useful Improvements in an Electric Animal-Trap, of which the following is a specification.

This invention relates to an electric animal trap, and one object is to produce a device more efficient than those heretofore employed for trapping and killing rats and other small animals.

A further object is to provide a trap in which means are provided for completing an electric circuit through the body of the animal when the latter is approaching the bait across an opening in the upper portion of a receptacle, through which opening the animal falls, life being rendered extinct by drowning, in the event that the full effect of the current is not realized.

A still further object is to provide a device in which an induction coil is employed for increasing the voltage of the current.

In the accompanying drawings, Figure 1 is a view of the device in vertical section. Fig. 2 is a diagrammatic view of another form, showing the manner of connecting the elements of the induction coil with parallel strips so positioned that the animal will pass over them is entering the trap. Fig. 3 is a vertical sectional view, showing a trap one side entrance of which is equipped with the contact making elements of Fig. 2. Fig. 4 is a horizontal section through the casing of the trap and above the platforms constituting contact making devices.

In carrying out my invention, I employ a casing 10 having an upper compartment 12, the lower wall of which is shown at 14, this wall supporting certain of the elements described below.

A battery 15 supplies current for the primary 16 of the induction coil, the secondary coil being shown at 17. The core 18 controls a vibrating member 19.

The circuit through the primary coil 16 is closed when the animal steps on either member 21, depressing the latter and completing a cricuit through contacts 23, 24 in the primary circuit (including wires 16' and 16''). The secondary circuit is through either contact 21, element 22 (carrying the bait), and wires 17' and 17''. The circuit is completed through the body of the animal when the latter takes the bait from element 22.

The primary circuit may also be completed between middle plate 21'', contact 23' and contact 24'. This circuit is through wire 16', wire 8, skeleton frame 27', contact 23', wire 24 (including contact 24') and wire 16''. The circuit of the secondary coil is then between elements 22 and 23', frame 27', wire 7 to wire 17''.

Entrance is effected through opening 27 or 28 in the casing, the bait being located in the central portion. If the shock is not sufficient to kill the animal, the muscular contraction will be sufficient to cause it to lose its balance and fall through opening 31 or 32 into the bottom of the casing, which may contain water. Actual use shows that the water is unnecessary, the current alone being sufficient. The entrances are narrow, (the side walls being designated 10',) so that in the event of incomplete contact at first, the animal will receive the full effect of the current, regardless of the bait, if the modified form of Fig. 2 is employed. In this form, the wire 35 and contact 36 are connected with primary 16 and with a source of current, and resilient strip 37 carrying a contact pin 36' has connection with wire 38 and the source of current. The circuit of the secondary is through wire 41 and plate 40, the body of the animal, and wire 38 (acting as a common return) and wire 38'. Strip 37 is normally held up by spring 37' (Figs. 3 and 4), and the various platforms are partly supported by springs such as those shown at 50, those of the central platform depending from ears 51 projecting from the uprights of the frame 27'.

What is claimed is—

1. In a trap of the class described, a casing including a lower chamber, a contact element for a secondary circuit, an induction coil, and a battery within the casing, a pair of contact making devices adjacent to each opening and between the latter and the contact element first named, an additional pair of contact making devices between the pairs of contacts adjacent to the openings, and conductors connected with the coil, the battery, the secondary contact element and the contacts of the respective pairs, for completing a primary circuit by pressure between the contacts of either pair, and completing a secondary circuit through the coil and through the body of an animal engaging the contact first named while the contacts of either pair are closed.

2. In a device of the class described, a plurality of contact strips arranged side by side and adapted to be positioned in the direction of travel in a narrow passageway, one of the strips being resiliently mounted for retaining a primary electric circuit normally open, means for completing the primary circuit when an animal depresses the resilient strip, and means for completing a secondary circuit through the resilient strip, the adjacent strip, and the body of an animal, when the primary circuit is closed.

In testimony whereof I affix my signature.

JOHNSON TUPPER.